United States Patent
Parekh et al.

(10) Patent No.: US 7,039,950 B2
(45) Date of Patent: May 2, 2006

(54) SYSTEM AND METHOD FOR NETWORK QUALITY OF SERVICE PROTECTION ON SECURITY BREACH DETECTION

(75) Inventors: Pankaj Parekh, Fremont, CA (US); Sandeep Gupta, New Delhi (IN); Vijay Mamtani, New Delhi (IN); Saurabh Sarpal, Fremont, CA (US)

(73) Assignee: iPolicy Networks, Inc., Fremont, CA (US)

( * ) Notice: Subject to any disclaimer, the term of this patent is extended or adjusted under 35 U.S.C. 154(b) by 100 days.

(21) Appl. No.: 10/419,548

(22) Filed: Apr. 21, 2003

(65) Prior Publication Data

US 2004/0250114 A1    Dec. 9, 2004

(51) Int. Cl.
*H04L 9/00* (2006.01)
*G06F 11/30* (2006.01)

(52) U.S. Cl. .................. 726/6; 726/22; 726/23; 726/25; 713/160; 713/188

(58) Field of Classification Search ........ 713/188, 713/201
See application file for complete search history.

(56) References Cited

U.S. PATENT DOCUMENTS

| | | | | |
|---|---|---|---|---|
| 5,473,769 A | * | 12/1995 | Cozza | 714/39 |
| 5,485,575 A | * | 1/1996 | Chess et al. | 714/38 |
| 5,832,208 A | * | 11/1998 | Chen et al. | 713/201 |
| 5,956,481 A | * | 9/1999 | Walsh et al. | 713/200 |
| 5,978,917 A | * | 11/1999 | Chi | 713/201 |
| 5,991,881 A | * | 11/1999 | Conklin et al. | 713/201 |
| 6,353,385 B1 | * | 3/2002 | Molini et al. | 340/506 |

* cited by examiner

*Primary Examiner*—Kambiz Zand
(74) *Attorney, Agent, or Firm*—Thelen Reid & Priest LLP; David B. Ritchie

(57) ABSTRACT

A system, method and computer program product for ensuring the quality of services being provided by a protected network of computers during an ongoing security breach is provided. The quality of the services is ensured by performing secure Quality of Service actions on data packets on the network. The sQoS actions depend on whether the data packets correspond to an attack on the computer to which they are directed, called the destination computer. If the data packet corresponds to an attack, then the actions also depend on the type of attack. In case there is no attack, the actions depend on the history of attacks by data packets that had originated from the same source computer and were directed towards the same destination computer. Supported actions include HardenFW, ControlBW and ConnectionLimit.

10 Claims, 14 Drawing Sheets

SYSTEM AND METHOD FOR NETWORK QUALITY OF SERVICE PROTECTION ON SECURITY BREACH DETECTION

BACKGROUND

The present invention relates to protecting computer networks against security breaches such as intrusion attacks. More specifically, it relates to a mechanism for securing the quality of service of the computer networks by responding to intrusion attacks on the computer networks.

Among the most common types of attacks on computer networks are intrusion attacks. These attacks can be categorized into categories such as application specific attacks, backdoor attacks, Denial of Service (DoS) attacks and Distributed Denial of Service (DDoS) attacks. Application specific attacks exploit the weaknesses in the application behavior to gain access to information or data that is otherwise denied to the attacker. Backdoor attempts break the security cover of network or hosts once and leave Trojan horses which can be used by the attacker to gain unauthorized access at will. DoS attacks attempt to crash a service being provided by a computer on a network or make it unusable, thereby denying the service to authorized users. In a typical DoS attack, a particular computer on the network attempts to crash the service. A more dangerous variety of a DoS attack is a DDoS attack. In such an attack, the attacking computer typically takes control of a large number of computers on the network, and attacks the host computer through them. Thus, legitimate users appear to be attackers, while the actual attacker is difficult to detect.

Recently, the amount of traffic on the Internet has increased enormously. At the same time, hacking activities on the Internet have also increased. This has led to an increase in threat of intrusion attacks on computer networks.

The increasing threat of intrusion attacks on computer networks has created a strong need for mechanisms which provide protection to computer networks from such attacks. Through such mechanisms, Internet Service Providers (ISPs) can offer safer Internet access to customers without interruption to the operation of the network. The ISPs need an intrusion protection solution that can detect, prevent, and react to unauthorized activity in any part of the network. Without such efficient mechanisms for intrusion attack protection, ISPs cannot obtain customer confidence in their ability to provide a secure network infrastructure.

An equally strong, if not stronger, need has been created due to the increasing threats of intrusion attacks and cyber terrorism on enterprise networks, government networks and military networks. Consequently, there is an increasing pressure on security administrators of these networks to put effective mechanisms in place to protect their networks against such attacks. However, current network architectures prove to be inadequate in providing full protection to these networks against such attacks.

In the past, various types of intrusion detection systems have been developed for networks such as the Internet. So far, primarily two types of intrusion detection devices have been developed. These are host-based intrusion detection systems and network-based intrusion detection systems.

Host-based intrusion detection systems typically run on the host system that they are protecting. An agent software is installed on the host server that is to be monitored. The agent software tracks unauthorized access attempts or other unauthorized activities on the host server.

Network-based intrusion detection systems typically run on the network itself. Typically, agents are installed on Local Area Network (LAN) segments or behind firewalls to monitor and analyze network traffic. These network-based intrusion detection systems typically provide intrusion detection while running in promiscuous mode on the network. These systems observe the network traffic and compare it against previously identified intrusion attack signatures.

However, just the detection of intrusion attacks does not provide protection against such attacks. Mechanisms are needed for providing response to such attacks so as to guard networks against these attacks. Also, responding effectively to DDoS attacks poses a challenge.

Thus, there is a need for mechanisms for effective and appropriate response to such attacks to protect ISP, enterprise and other networks. Further, there is need for mechanisms for effectively responding to and protecting networks against various types of intrusion attacks, including DDoS attacks. Moreover, there is a need for mechanisms to maintain Quality of Service levels of the computer network being protected even while an ongoing intrusion attack

SUMMARY

The present invention is a system, method and computer program product for performing secure Quality of Service (sQoS) actions on data packets, the data packets being transmitted to a protected network of computers, the actions being performed to ensure the quality of service even during an ongoing intrusion attack.

In accordance with one aspect, the present invention provides a system, method and computer program product for providing sQoS responses to intrusion attacks and thereby to counter attempts to degrade the quality of service of a network of computers.

In accordance with another aspect, the present invention provides a system, method and computer program product for providing protection to computers on a computer network from intrusion attacks, the protection being provided by utilizing the history of intrusion attacks on the computers.

In accordance with another aspect, the present invention provides a system, method and computer program product for storing historical information regarding intrusion attacks on computers in a network of computers.

In accordance with another aspect, the present invention provides a system, method and computer program product for controlling the flow of data packets suspected of causing an intrusion attack from a source computer network and/or to a destination computer network, the flow being controlled on the detection of the intrusion attack, the flow being controlled on the basis of the length of the suspected data packets.

In accordance with an additional aspect, the present invention provides a system, method and computer program product for controlling the flow of data packets suspected of causing an intrusion attack from a source computer network and/or to a destination computer network, the flow being controlled on the detection of the intrusion attack, the flow being controlled on the basis of the rate of arrival of new requests for providing service.

In accordance with a further aspect, the present invention provides a system, method and computer program product for controlling the flow of data packets suspected of causing the intrusion attack from a source computer network and/or to a destination network of computers, the flow being controlled on the detection the intrusion attack, the flow being controlled by hardening firewalls on the network for the traffic from the source computer network

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

Figure 1:
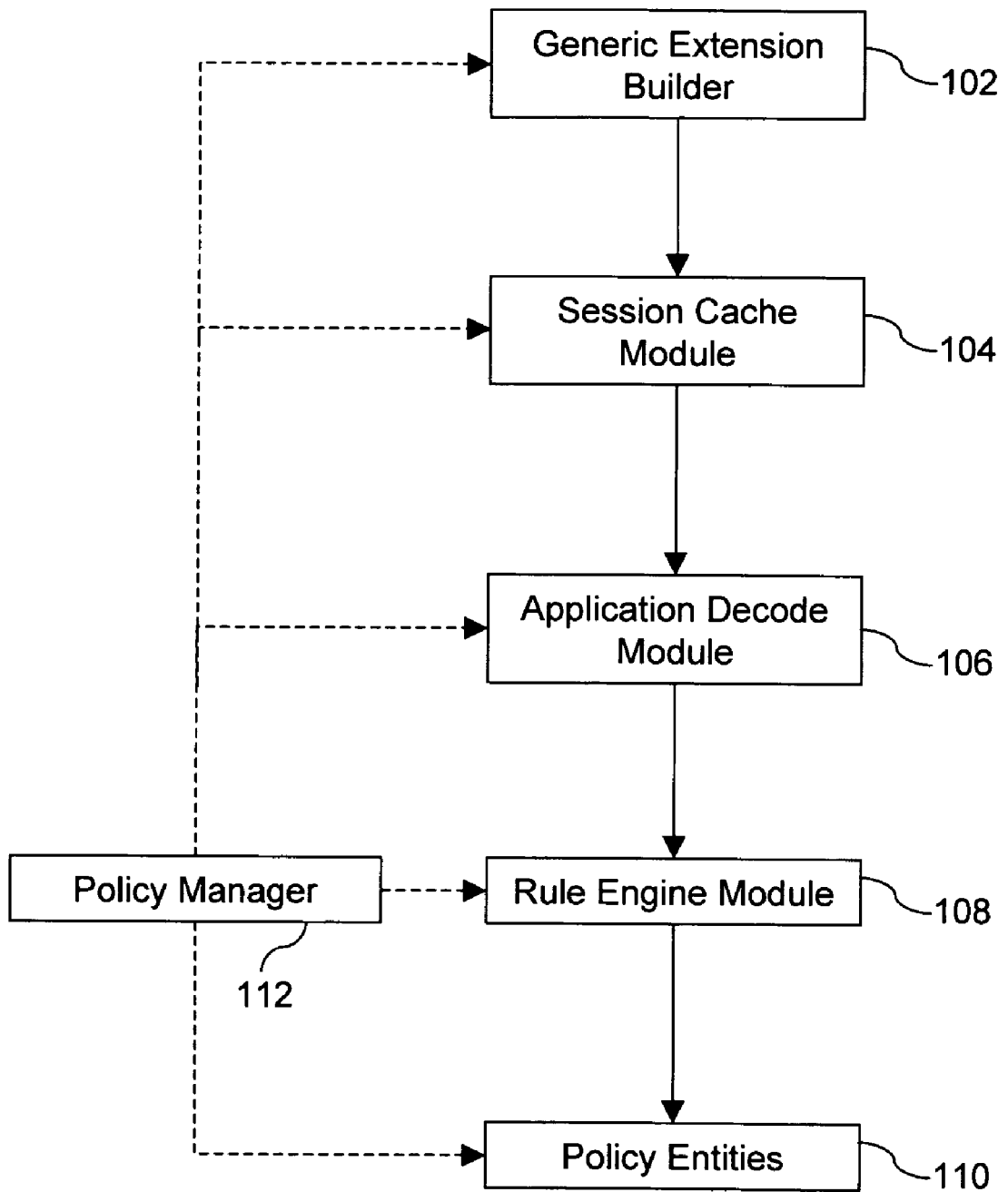
FIG. 1 depicts the functional modules of an exemplary Policy Agent.

As used herein, the term data packets broadly refers to units of data that are sent on any packet-switched network or the like, and encompasses Transmission Control Protocol/Internet Protocol (TCP/IP) packets, User Datagram Protocol (UDP) packets, which may also be referred to as datagrams, or any other such units of data.

Henceforth, the computer where the data packets originated will be termed as the source computer. Also, the computer to which the data packets are directed will be termed as the destination computer. The source computer and the destination computer can be any two of the plurality of computers on the computer network.

The present invention provides a system, method and computer program product for providing secure Quality of Service (sQoS) action on one or more data packets on a network of computers. The actions performed are in response to security breaches such as intrusion attacks on one or more computers on the network.

Based on the various mechanisms that are used for detection, intrusion attacks can be classified into packet based attacks, sequence based attacks and counter based attacks. A packet based attack is said to be detected when any packet matches a defined characteristics for intrusion. A sequence based attack is said to be detected when a sequence of packets matches a defined characteristics for intrusion. A counter based attack is said to be detected when the number of packets arriving within a defined time interval matches a defined characteristics for intrusion.

Counter based attacks may also be one of the following two types—DoS attacks and DDoS attacks. In a counter based DoS attack a source computer attacks one or more destination computers on a network. In this case, there is one source of the intrusion attack and it is possible to respond to the attack by taking sQoS actions against the source computer.

In a counter based DDoS attack, multiple source computers attack one or more destination computers on a network. In this case, it is not feasible to take actions against data packets originating from all the attacking source computers. For example, it may not be feasible to block the passage of the data packets originating from a large number of source computers. This problem is further compounded by the fact that the attacking source computers may actually be under the control of a different computer on the network. Hence, in response to a counter based DDoS attack, the actions are performed on the data packets suspected of causing the attack that are directed towards the destination computer that is under attack.

Depending on the type of attack, there are a number of actions that can be performed. For example in one type of action, the passage of the data packets originating from a particular source computer may be restricted or even blocked. The actions that can be performed in response to packet based attacks, sequence based attacks and counter based DoS attacks include, but are not limited to, hardening a firewall ("HardenFW"), controlling the bandwidth ("ControlBW") and limiting the number of connections ("ConnectionLimit"). The HardenFW action involves hardening a firewall to block the passage of data packets from the attacking source computer. The ControlBW action involves restricting the passage of the data packets from the attacking source computer on the basis of the length of the data packets. The ConnectionLimit action involves restricting the number of connections between the attacking source computer and the destination computer being attacked. The actions that can be performed in response to counter based DDoS attacks include, but are not limited to, ControlBW and ConnectionLimit. All these actions are discussed in detail later.

The present invention is envisaged to be operating within an integrated policy enforcement system hereinafter referred to as Policy Agent. The policy agent may be embodied in a product such as the ipEnforcer 5000® as provided by iPolicy Networks Inc. of Fremont, Calif. This product is used to enforce management policies on networks, and is placed at a point where packets enter a network. Further, the policy agent may be encoded in a programming language such as C or Assembly.

The Policy Agent scans data packets as they pass through it, and enforces network policies on these packets. Although the Policy Agent may be variously provided, a description of one such Policy Agent can be found in U.S. patent application Ser. No. 10/052,745 filed on Jan. 17, 2002, and titled "Architecture for an Integrated Policy Enforcement System"; the entire contents of which are hereby incorporated by reference. However, it may be noted that the present invention may be adapted to operate in other Policy Agents by one skilled in the art.

Referring primarily to FIG. 1, the various functional modules of an exemplary Policy Agent are hereinafter described in detail. The Policy Agent comprises a Generic Extension Builder 102, a Session Cache Module 104, an Application Decode Module 106, a Rule Engine Module 108 and a Policy Entities 110. The Policy Agent is also supported by a Policy Manager 112. A packet entering the Policy Agent travels through these functional modules. Each functional module appends its output to extensions in the packet, which are then used by subsequent modules of the Policy Agent.

Generic Extension Builder 102 processes the packet headers for information related to Open Systems Interconnection (OSI) Layer 2 and Layer 3.

Session Cache Module 104 processes the packet headers for information related to OSI Layer 4 and layers above it.

Application Decode Module 106 identifies the application generating the packet and tracks the packet as it transitions from one application state to another.

Rule Engine Module 108 makes policy decisions based on the information gathered from the previous modules. It identifies rules matched by a packet, and passes this information to Policy Entities 110.

Policy Entities 110 comprises policy-processing modules, which are also referred to as Service Application Modules (SAMs). These modules analyze the packet further according to its requirements and enforce policies. SAMs include, but are not limited to, Firewall modules, Intrusion Detection System (IDS) modules, Virtual Private Network (VPN) modules and modules for providing sQoS actions, henceforth referred to as sQoS modules.

Policy Manager 112 comprises policy rules, which are implemented by the Policy Agent.

The IDS modules apply a set of intrusion detection policies to each of the data packets flowing on the network, to determine whether the data packet corresponds to an attack. If one of the IDS modules detects an attack, it also determines the type of attack, which could be either counter based attack, or packet based attack or sequence based attack. The IDS module then passes on this information to one of the plurality of sQoS modules. The sQoS module then performs the action on the data packet in accordance with one embodiment of the present invention.

Although the IDS modules may be variously provided, a description of one such IDS module can be found in U.S. patent application Ser. No. 10/052,328 filed on Jan. 17, 2002, and titled "System and Method for Detection of Intrusion Attacks on Packets Transmitted on a Network"; the entire contents of which are hereby incorporated by reference. However, it may be noted that the present invention may be adapted to operate in conjunction with other IDS modules by one skilled in the art. It may also be noted that while the triggering of secure Quality of Service actions have been described with reference to an IDS module, other SAM modules such as Firewall or Anti-virus can also trigger secure Quality of Service actions.

This information sent by the IDS module acts as a trigger for the sQoS module for performing the relevant actions. As mentioned earlier, depending on whether there is an attack and also on the type of the attack, the sQoS module performs appropriate action on the data packet.

In case the attack is either a packet based attack, or a sequence based attack or a counter based DoS attack, an Intrusion Attacker Table (IAT) is used to facilitate the appropriate actions. Various attributes that determine the type and extent of the actions are stored in this table. The IAT also stores historical information regarding past attacks. For example, this information may include the actions that were performed in response to previous attacks from a particular source computer. This information may also include a time period for which the previous actions were in force. This information is used to take appropriate actions on the data packets from the source computers that had attacked.

The attributes stored in each record of the IAT include, but are not limited to, the IP address of the source computer that has attacked, the action performed on the data packet that has caused the attack, and a time period for which the action will be in force. Each record may further include any other attributes, which may be deemed to be necessary for performing the action on subsequent data packets.

The IAT is also used facilitate appropriate actions on the data packets even when there is no attack. In such cases, the data packets are processed against the IAT. Processing the packet against the IAT involves searching for a record in the IAT corresponding to the IP address of the source computer. If there exists such a record and the time period of an action stored in such a record has not expired, the action will be performed on the data packets. More details about the step of processing the packet against the IAT are disclosed later.

Figure 2:
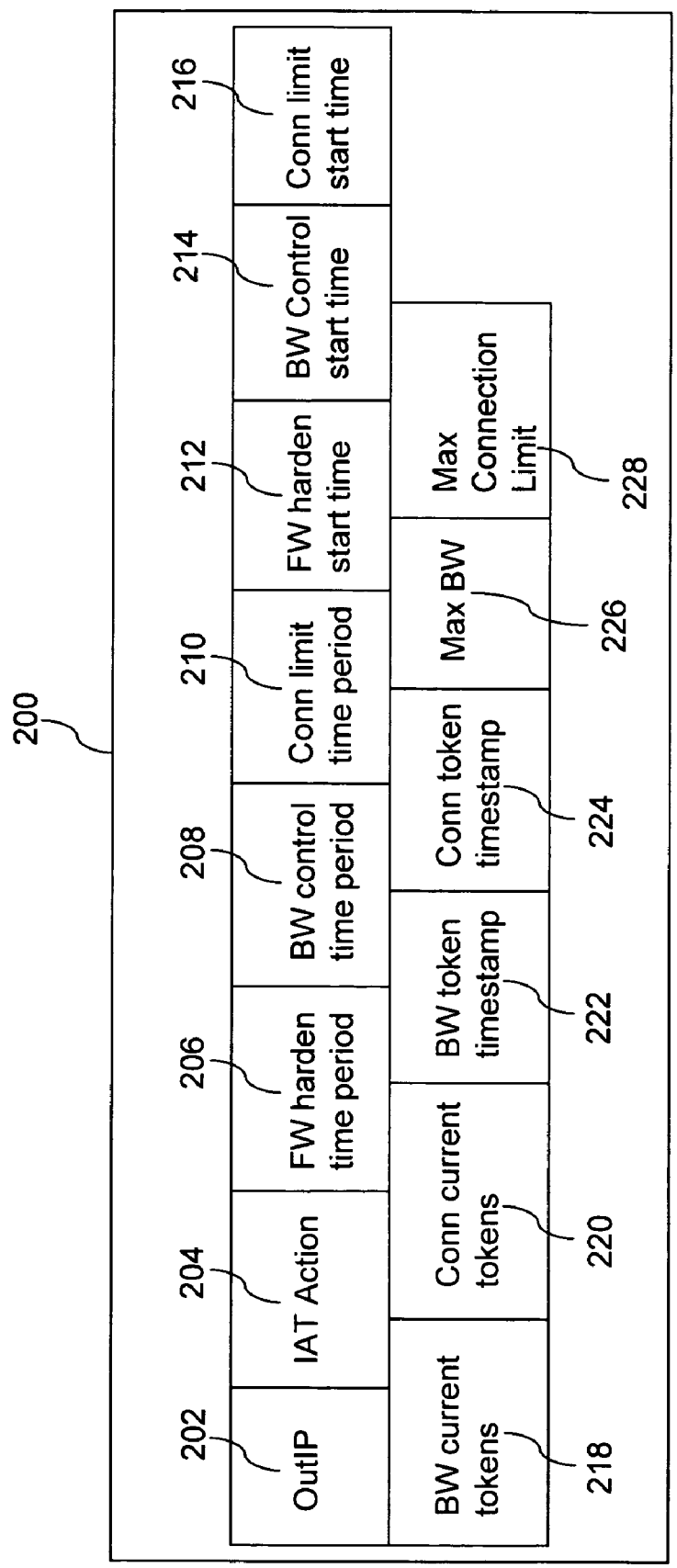
FIG. 2 depicts the attributes of each record of an Intrusion Attacker Table (IAT) in accordance with a preferred embodiment of the invention.

Referring now primarily to FIG. 2, the attributes of each record of the IAT in accordance with a preferred embodiment of the invention are hereinafter described in detail. A record 200 of the IAT comprises the following attributes:

An OutIP 202—OutIP 202 denotes the IP address of the source computer that originated the intrusion.

An IAT Action 204—IAT Action 204 denotes the action performed on the data packet in case of attack. This action includes, but is not limited to, HardenFW, ControlBW and ConnectionLimit.

An FW harden time period 206—FW harden time period 206 denotes the time interval for which HardenFW action will be active, once applied on the OutIP.

A BW control time period 208—BW control time period 208 denotes the time interval for which ControlBW action will be active, once applied to the OutIP.

A Conn limit time period 210—Conn limit time period 210 denotes the time interval for which ConnectionLimit will be active, once applied to the OutIP.

An FW harden start time 212—FW harden start time 212 denotes an initial timestamp at which HardenFW action was applied on the OutIP.

A BW control start time 214—BW control start time 214 denotes an initial timestamp at which ControlBW action was applied on the OutIP.

A Conn limit start time 216—Conn limit start time 216 denotes an initial timestamp at which ConnectionLimit action was applied on the OutIP.

A BW current tokens 218—BW current tokens 218 denotes the number of bytes of data that can be sent in a data packet to keep the bandwidth under control, in case of ControlBW action.

A Conn current tokens 220—Conn current tokens 220 denotes the number of connections that can be allowed to keep the rate under control, in case of ConnectionLimit action.

A BW token timestamp 222—BW token timestamp 222 denotes the timestamp when the value of BW current tokens was last updated.

A Conn token timestamp 224—Conn token timestamp 224 denotes the timestamp when the value of Conn current tokens was last updated.

A Max BW 226—Max BW 226 denotes the upper limit on the value of BW current tokens for the OutIP.

A Max Connection rate 228—Max Connection rate 228 denotes the upper limit on the value of Conn current tokens for the OutIP.

In case of counter based DDoS attacks, an Intrusion Counter Table (COT) is used to facilitate the actions performed. The COT stores information on the basis of the IP address of the computer being attacked. Also, attributes related to the HardenFW action are not present in the COT.

Figure 3:
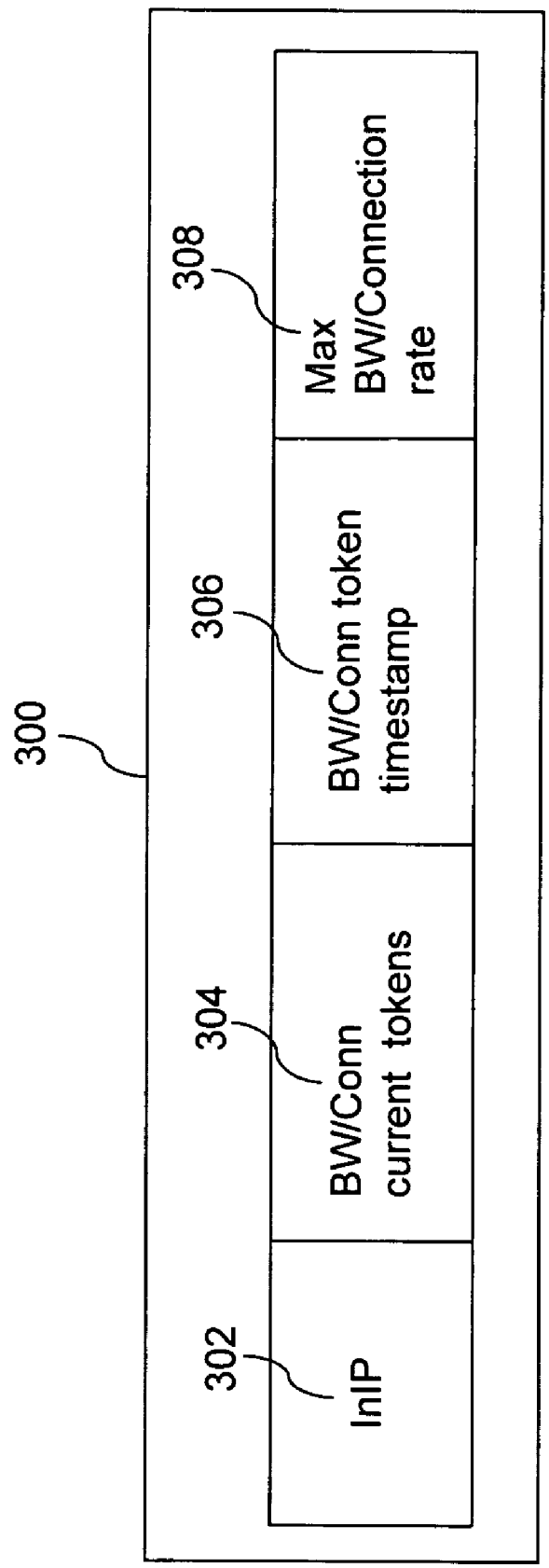
FIG. 3 depicts the attributes of each record of an Intrusion Counter Table (COT) in accordance with a preferred embodiment of the invention.

Referring now primarily to FIG. 3, the attributes of each record of the COT in accordance with a preferred embodiment of the invention are hereinafter described in detail. A record 300 of the IAT comprises the following attributes:

An InIP 302—InIP 302 denotes the IP address of the destination computer that is under attack.

A BW/Conn current tokens 304—in case of ControlBW action, BW/Conn current tokens 304 denotes the number of bytes of data that can be sent in a data packet to keep the bandwidth under control. In case of ConnectionLimit action, BW/Conn current tokens 304 denotes the number of connections that can be allowed to keep the rate under control.

A BW/Conn token timestamp 306—BW/Conn token timestamp 306 denotes the timestamp when the value of BW/Conn current tokens was last updated.

A Max BW/Connection rate 308—Max BW/Connection rate 308 denotes the upper limit on the value of BW/Conn current tokens for the InIP.

Described below are the various policies that govern the response of the sQoS module when it receives triggering information from the IDS module.

Figure 4A:
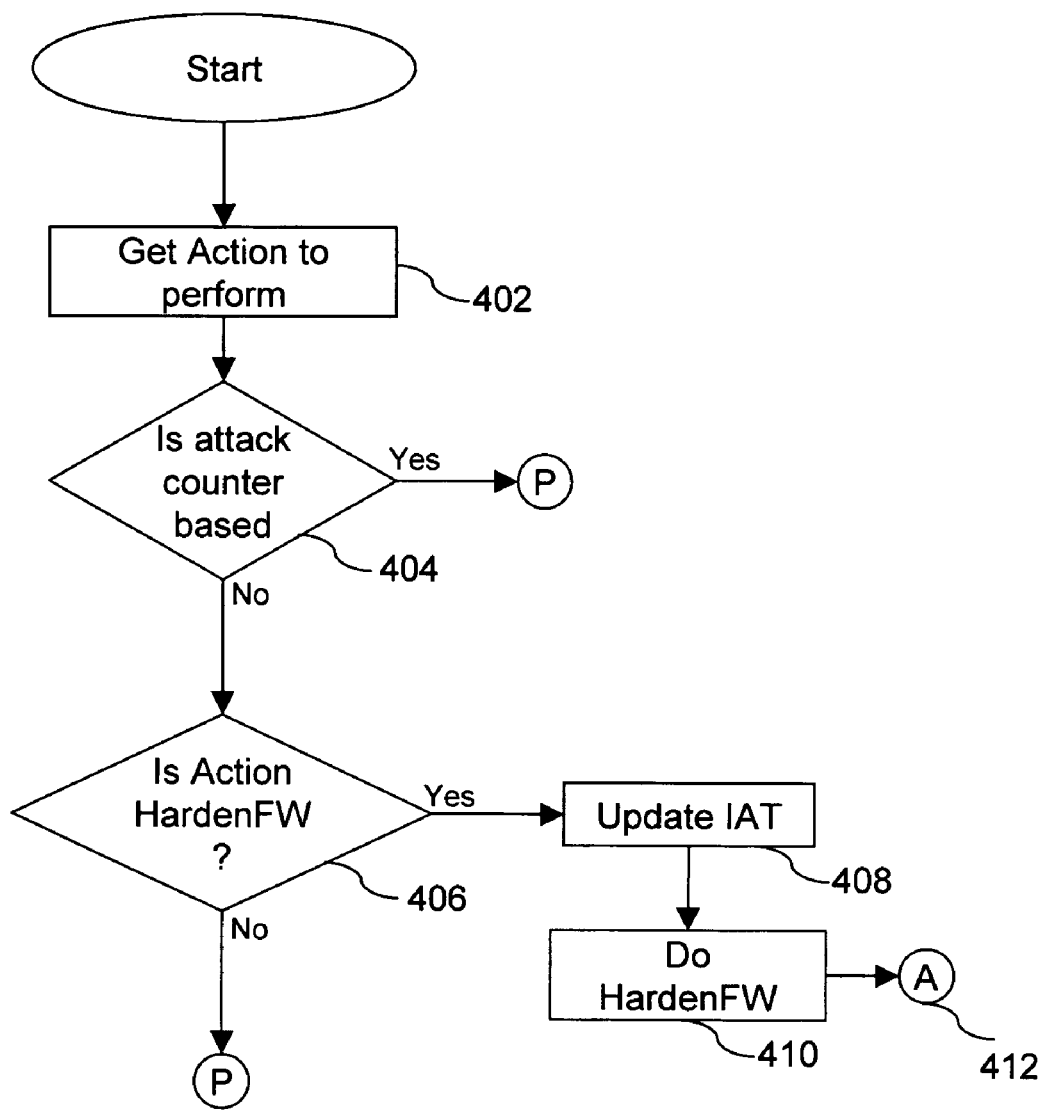
FIG. 4A, FIG. 4B and FIG. 4C depict sQoS actions on a data packet, in case the data packet is suspected as one of the packets causing an attack.
Figure 4B:
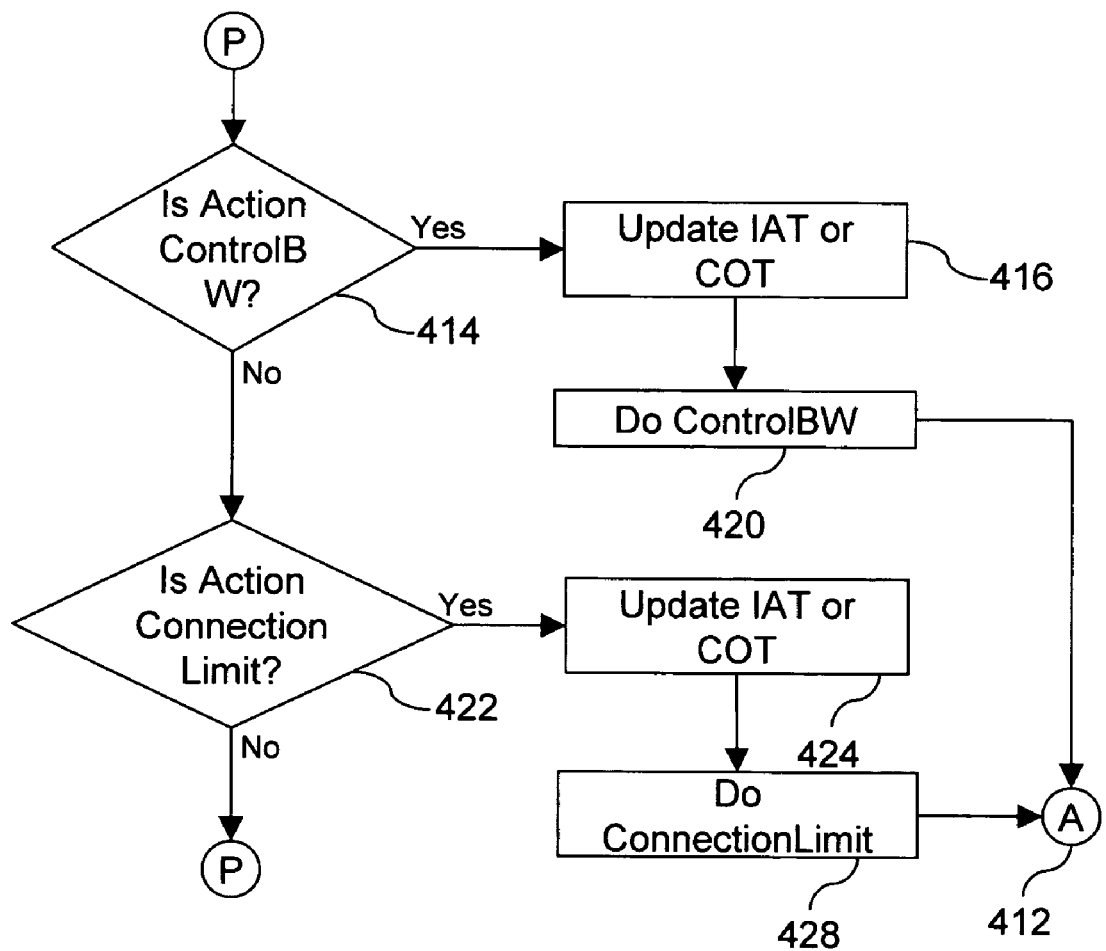
Figure 4C:
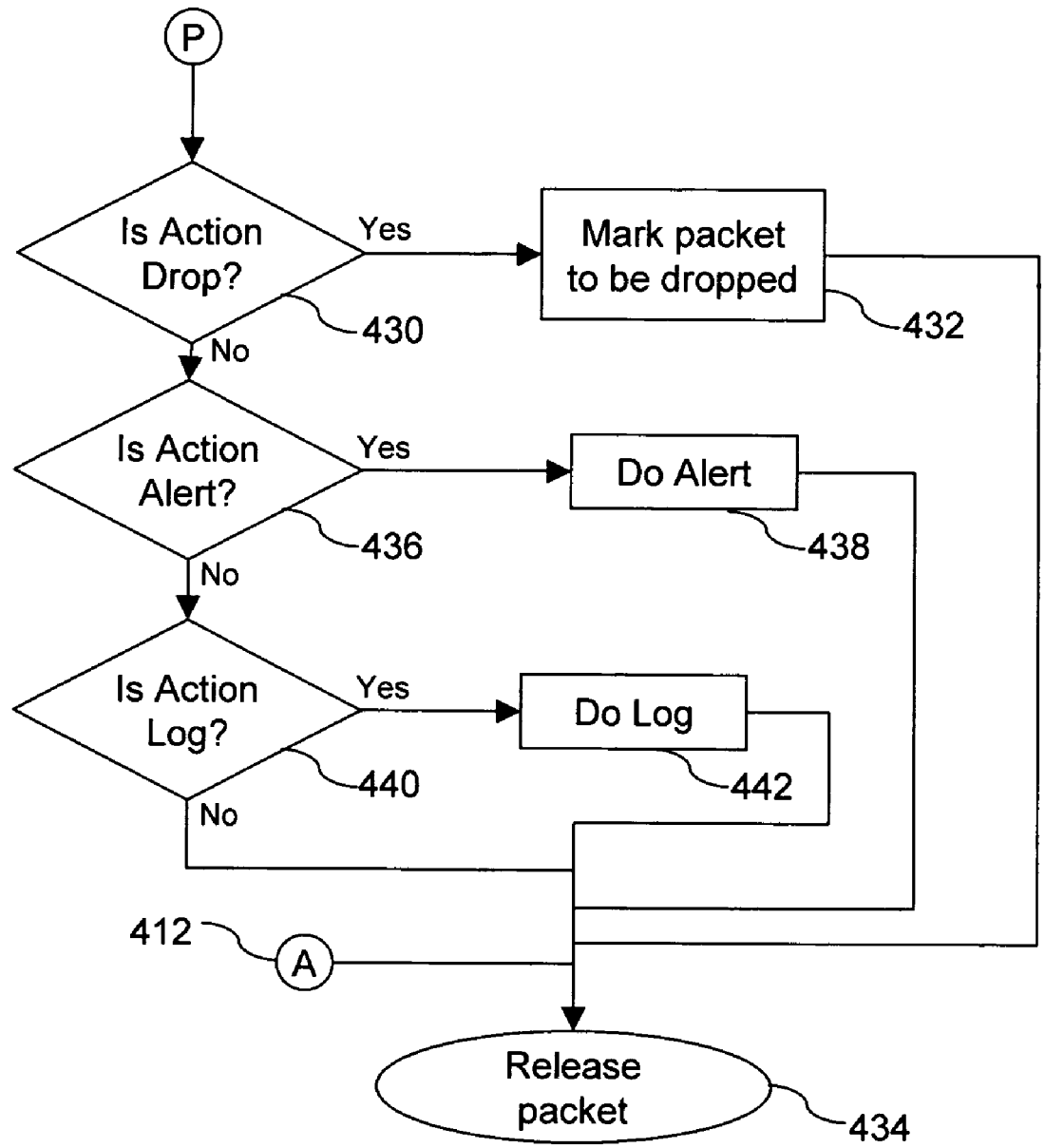

Referring now primarily to FIG. 4A, FIG. 4B and FIG. 4C, the sQoS actions when the information sent by the IDS corresponds to an attack are hereinafter described in detail. At step 402, the sQoS module gets the action to be performed in response to the attack. Subsequently at step 404 a check is made to determine whether the information sent by the IDS corresponds to a counter based DDoS attack. If the information does not correspond to a counter based DDoS attack, then at step 406 a check is made to determine whether the action is HardenFW. If the action is HardenFW, then the IAT is updated at step 408 and the action is performed on the data packet at step 410. The HardenFW action involves marking the packet to be dropped. Subsequently the packet is sent for processing against the IAT, as shown with the help of a connector 412.

Regardless of the type of attack, at step 414 a check is made to determine whether the action is ControlBW. If the action is ControlBW, then at step 416 either the COT or the IAT is updated. The table to be updated is selected on the basis of the type of attack. The COT is updated if the attack is a counter based DDoS attack, whereas the IAT is updated if the attack is either a packet based attack, or a sequence based attack or a counter based DoS attack. Subsequently at step 420 the action is performed on the data packet. Then the packet is sent for processing against the IAT, as shown with the help of connector 412. More details about the ControlBW action are disclosed later.

Referring back to step 414, if the action is not ControlBW, then at step 422 a check is made to determine whether the action is ConnectionLimit. If the action is ConnectionLimit, then at step 424 either the COT or the IAT is updated. The COT is updated if the attack is a counter based DDoS attack, while the IAT is updated if the attack is either a packet based attack, or a sequence based attack or a counter based DoS attack. Subsequently at step 428 the action is performed on the data packet. Then the packet is sent for processing against the IAT, as shown with the help of connector 412. More details about the ConnectionLimit action are disclosed later.

Referring back to step 422, if the action is not ConnectionLimit, then at step 430 a check is made to determine whether the action is Drop. If the action is Drop, then the data packet is marked to be dropped at step 432. Subsequently the packet is sent for processing against the IAT at step 434.

Referring back to step 430, if the action is not Drop, then at step 436 a check is made to determine whether the action is Alert. If the action is Alert, then an alert message is generated at step 438. Subsequently the packet is sent for processing against the IAT at step 434.

Referring back to step 436, if the action is not Alert, then at step 440 a check is made to determine whether the action is Log. If the action is Log, then a log table is updated with information about the intrusion at step 442. Subsequently the packet is sent for processing against the IAT at step 434.

Referring back to step 440, if the action is not Log, then the data packet is sent for processing against the IAT at step 434 without any action.

Figure 5A:
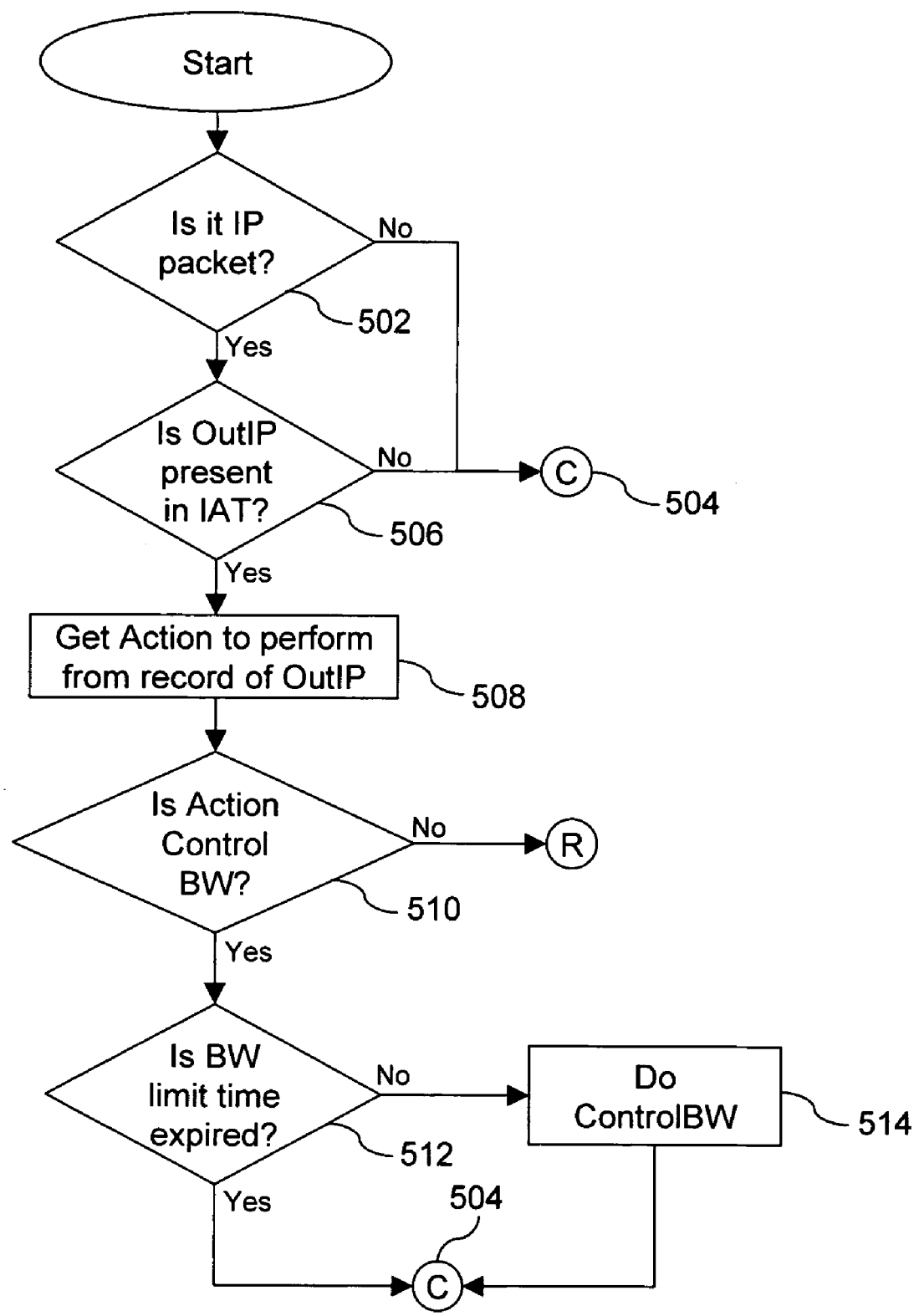
FIG. 5A, FIG. 5B and FIG. 5C depict sQoS actions on a data packet, irrespective of whether the data packet is suspected for causing an attack or not.
Figure 5B:
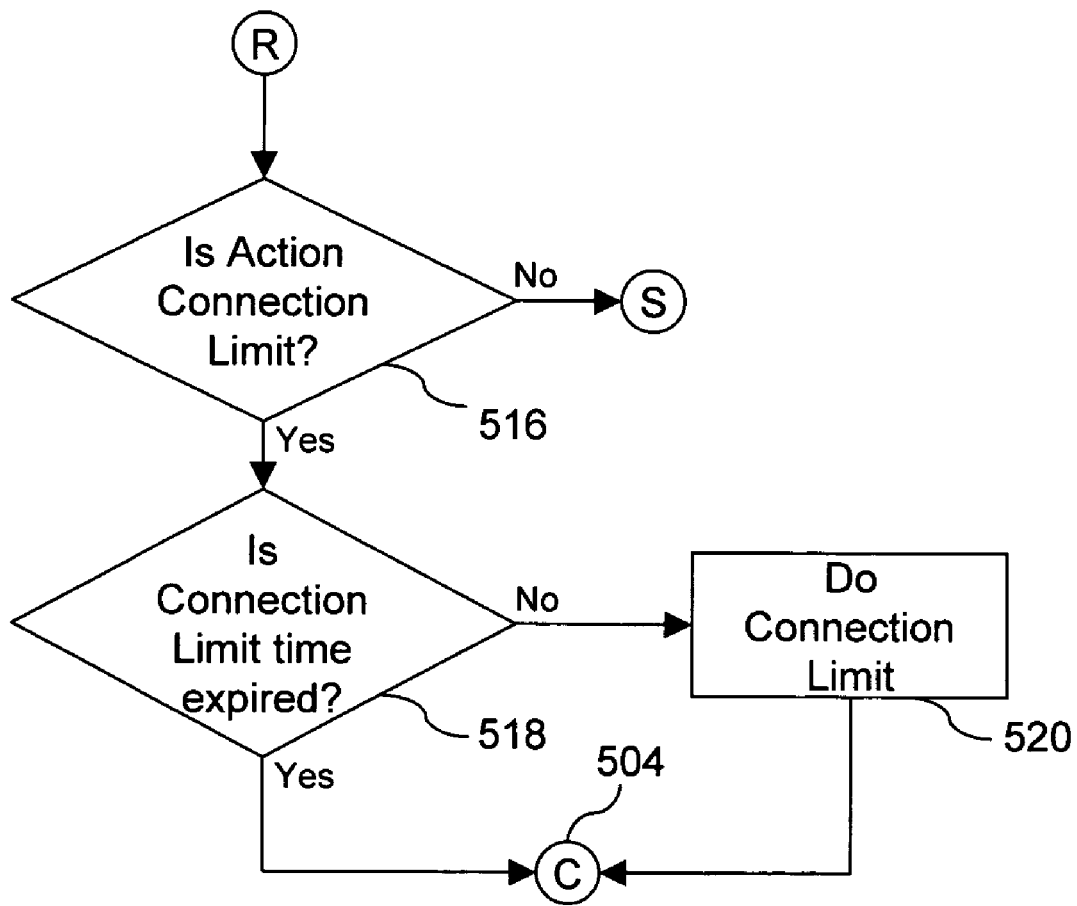
Figure 5C:
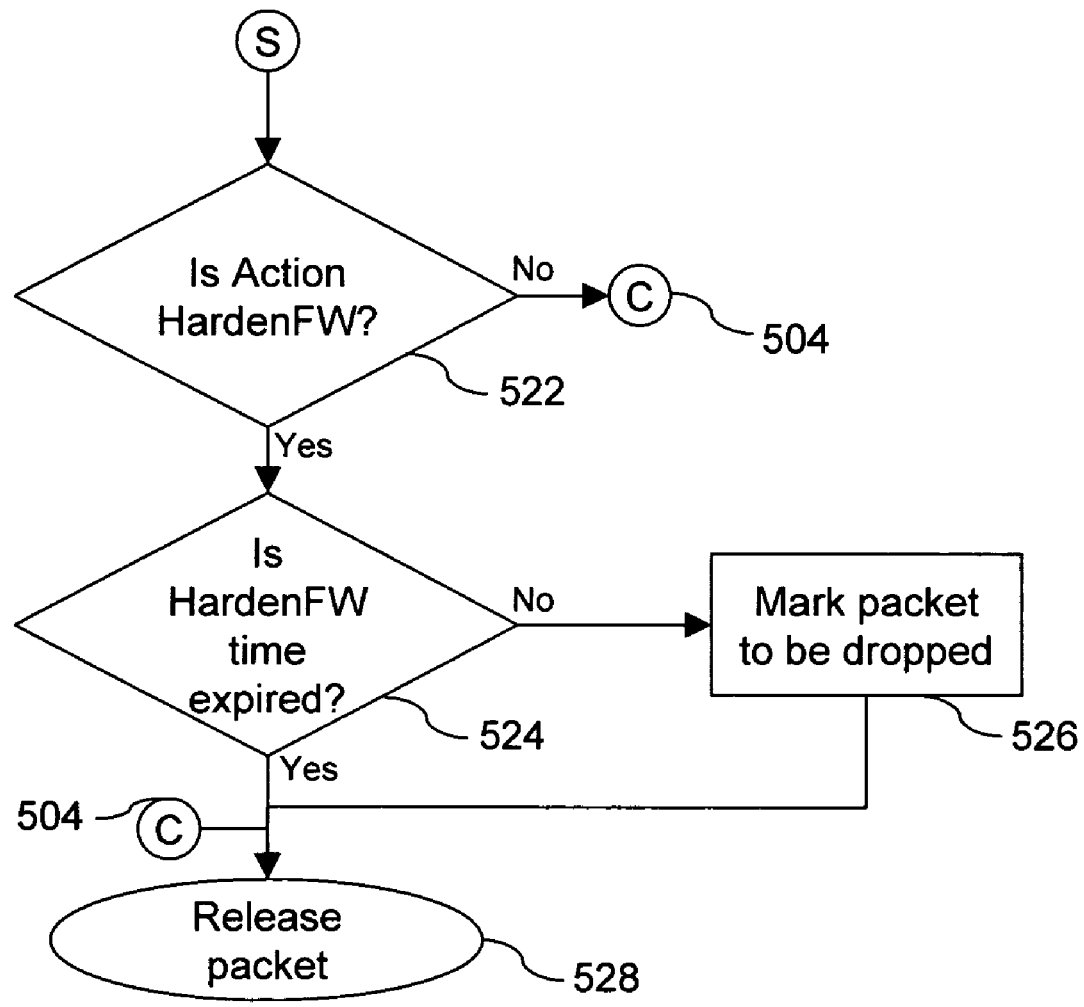

Referring now primarily to FIG. 5A, FIG. 5B and FIG. 5C, the sQoS actions when a data packet has been sent to be processed against the IAT are hereinafter described in detail. At step 502, the sQoS module checks whether the data packet is an IP packet. If the data packet is not an IP packet, the packet is released, as shown with the help of a connector 504. However, if the data packet is an IP packet, then the sQoS module looks for a record corresponding to IP address of the source computer, hereinafter referred as OutIP. If there is no such record present at step 506, then the packet is released, as shown with the help of connector 504. However, if the record corresponding to OutIP is present in the IAT, then the sQoS module gets the corresponding action from the record in the IAT at step 508.

At step 510, a check is made to determine whether the action is ControlBW. Referring to step 510, if the action is ControlBW, then at step 512 the sQoS module uses the attributes BW control start time and BW control time period of the IAT record to check whether the period for which the action was in force has expired. If this period has not expired, then the ControlBW action is performed on the data packet at step 514. Subsequently, regardless of the result of step 512, the packet is released, as shown with the help of connector 504. Details about the ControlBW action are disclosed later.

Referring back to step 510, if the action is not ControlBW, then at step 516 a check is made to determine whether the action is ConnectionLimit. If the action ConnectionLimit, then at step 518 the sQoS module uses the attributes Conn limit start time and Conn limit time period attributes of the IAT record to check whether the period for which the action was in force has expired. If this period has expired, then no action is performed on the packet. However, if this period has not expired, then the ConnectionLimit action is performed on the data packet at step 520. Subsequently, regardless of the result of step 518, the packet is released, as shown with the help of connector 504. Details about the ConnectionLimit action are disclosed later.

Referring back to step 516, if the action is not ConnectionLimit, then at step 522 a check is made to determine whether the action is HardenFW. If the action is HardenFW, then at step 524 the sQoS module uses the attributes FW harden start time and FW harden time period of the IAT record to check whether the period for which the action was in force has expired. If this period has expired, then no action is performed on the packet. However, if this period has not expired, the packet is marked to be dropped at step 526. Subsequently, regardless of the result of step 524, the packet is released at step 528.

Figure 6A:
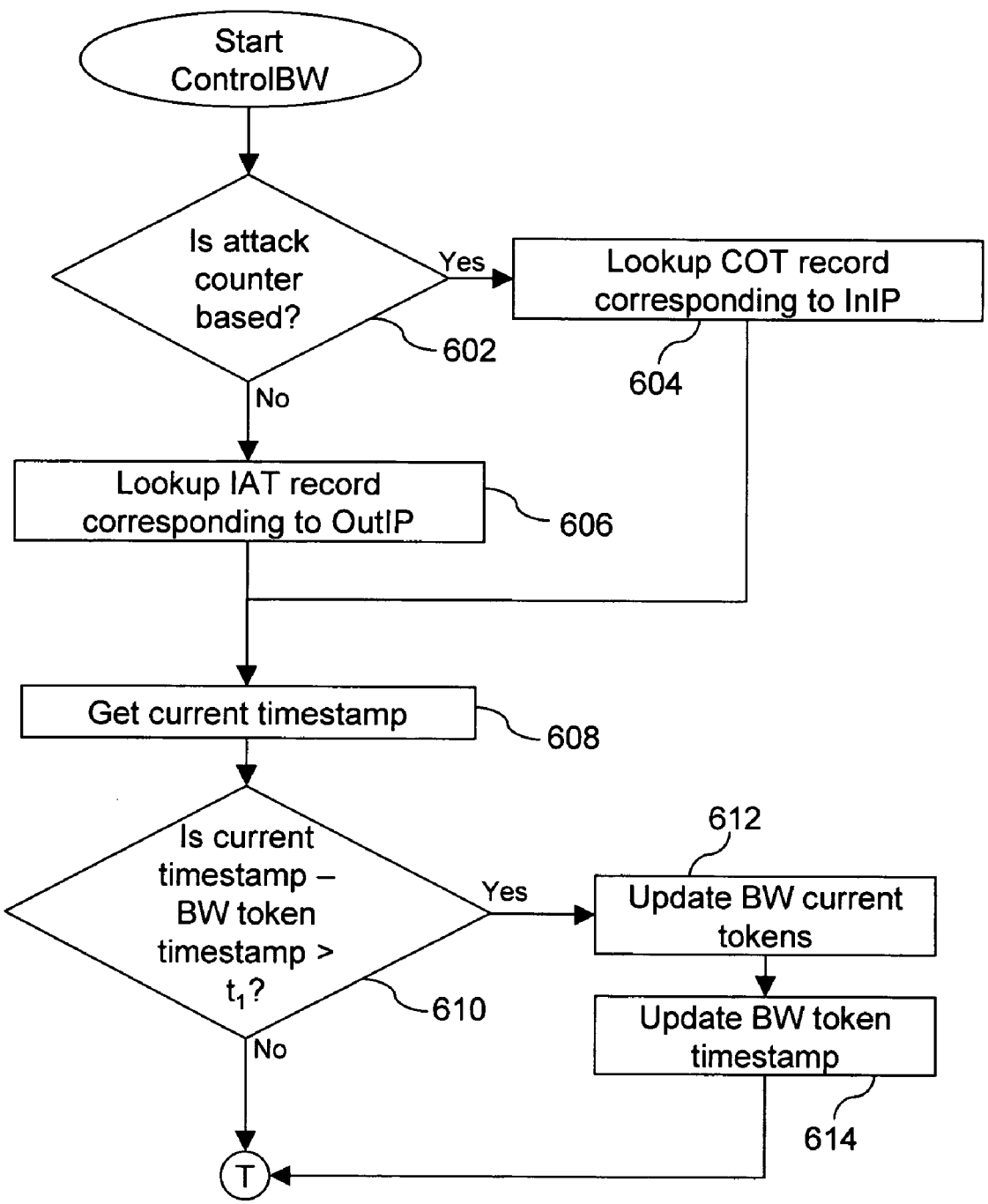
FIG. 6A and FIG. 6B depict the step of performing ControlBW sQoS action on a data packet.
Figure 6B:
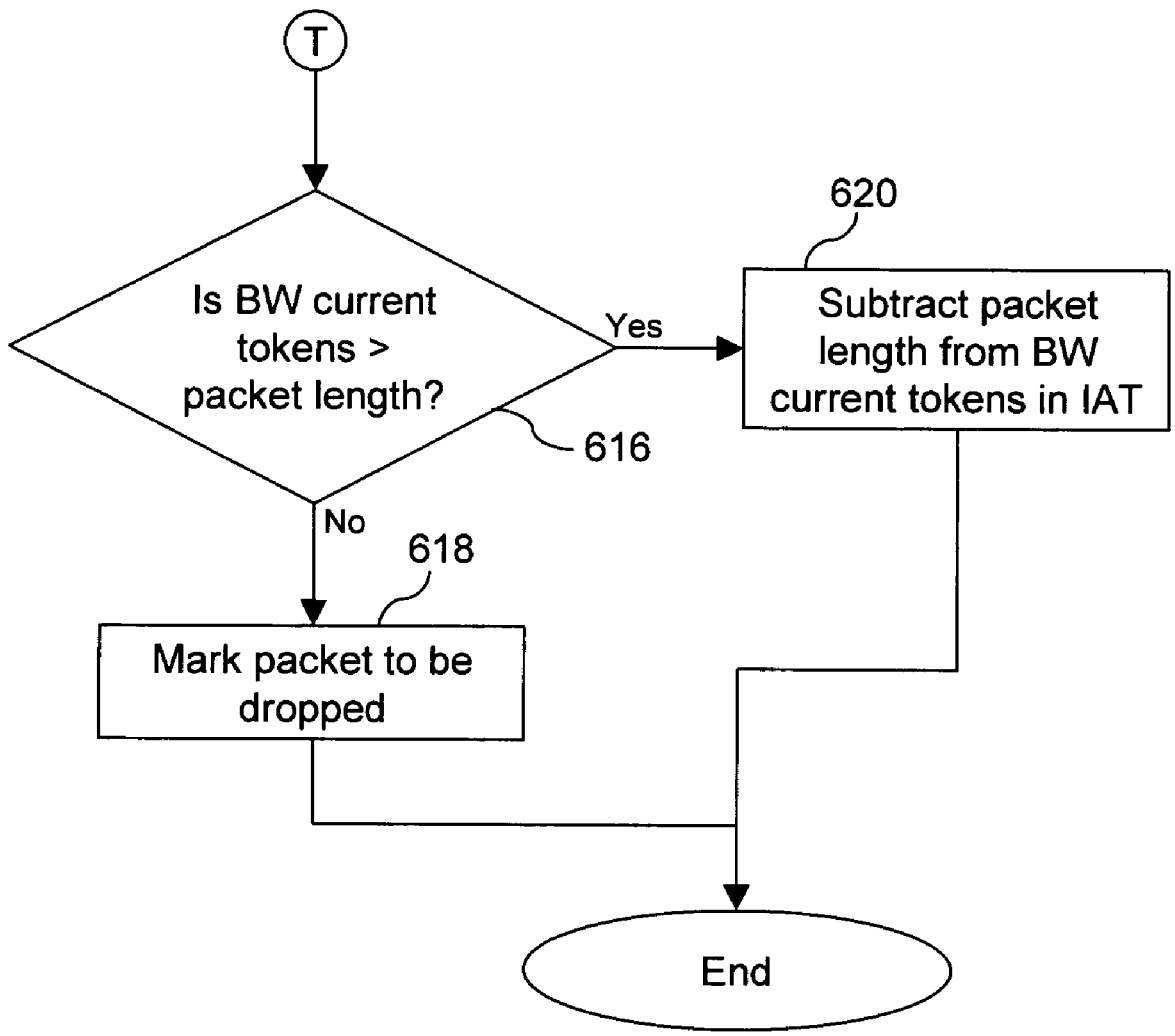

As mentioned earlier, one of the actions that can be performed on the data packet is ControlBW. This action involves controlling the passage of the data packets on the network based on the length of the data packets. Referring now primarily to FIG. 6A and FIG. 6B, the ControlBW action is hereinafter described in detail. At step 602, a check is made to determine whether the attack is a counter based DDoS attack. If the attack is a counter based DDoS attack, then at step 604 a record corresponding to InIP is retrieved from the COT. If the attack is not a counter based DDoS attack, then at step 606 a record corresponding to OutIP is looked up from the IAT. After the record has been retrieved from the appropriate table, a value of current timestamp is obtained at step 608.

At step 610 the value of BW token timestamp is compared with the value of current timestamp. If the value of current timestamp is greater than the value of BW token timestamp by at least a pre-defined value $t_1$, then at step 612 the value of BW current tokens is increased in the record.

Subsequently at step 614 the value of BW token timestamp is updated with the value of current timestamp. Then, regardless of the result of step 610, the value of BW current tokens is compared at step 616 with the length of the data packet under consideration. If the length of the data packet is more than the value of BW current tokens, the data packet is marked to be dropped at step 618. Otherwise at step 620 the value of BW current tokens is reduced by an amount equal to the length of the data packet.

In a preferred embodiment of the present invention, the value of $t_1$ is set as 1 second. Also, the value of BW current tokens is increased to Max BW when the required condition is met.

In an alternative embodiment of the present invention, the increase in the value of BW current tokens is proportional to the difference between the value of current timestamp and the value of BW token timestamp.

Figure 7A:
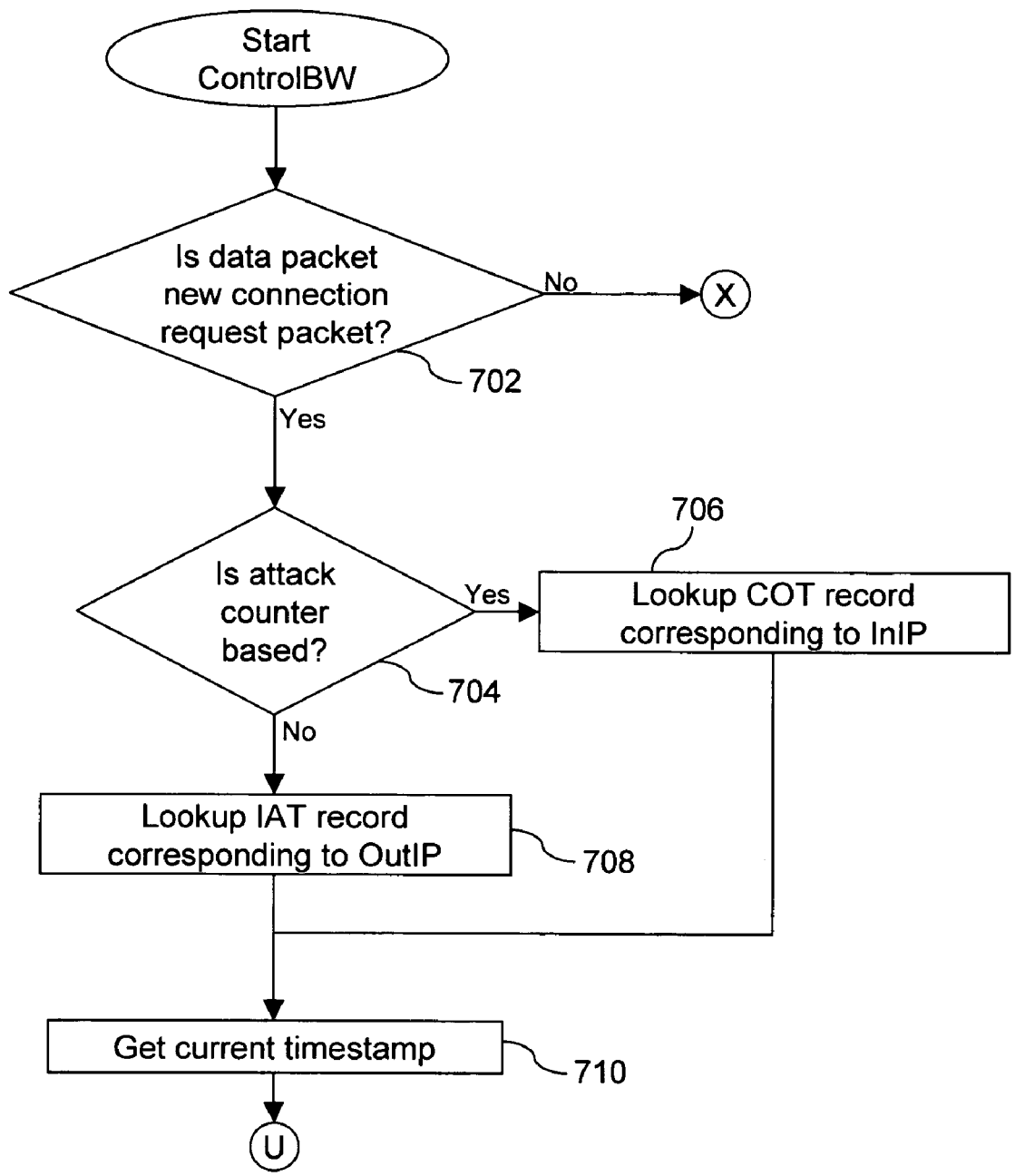
FIG. 7A and FIG. 7B depict the step of performing ConnectionLimit sQoS action on a data packet.
Figure 7B:
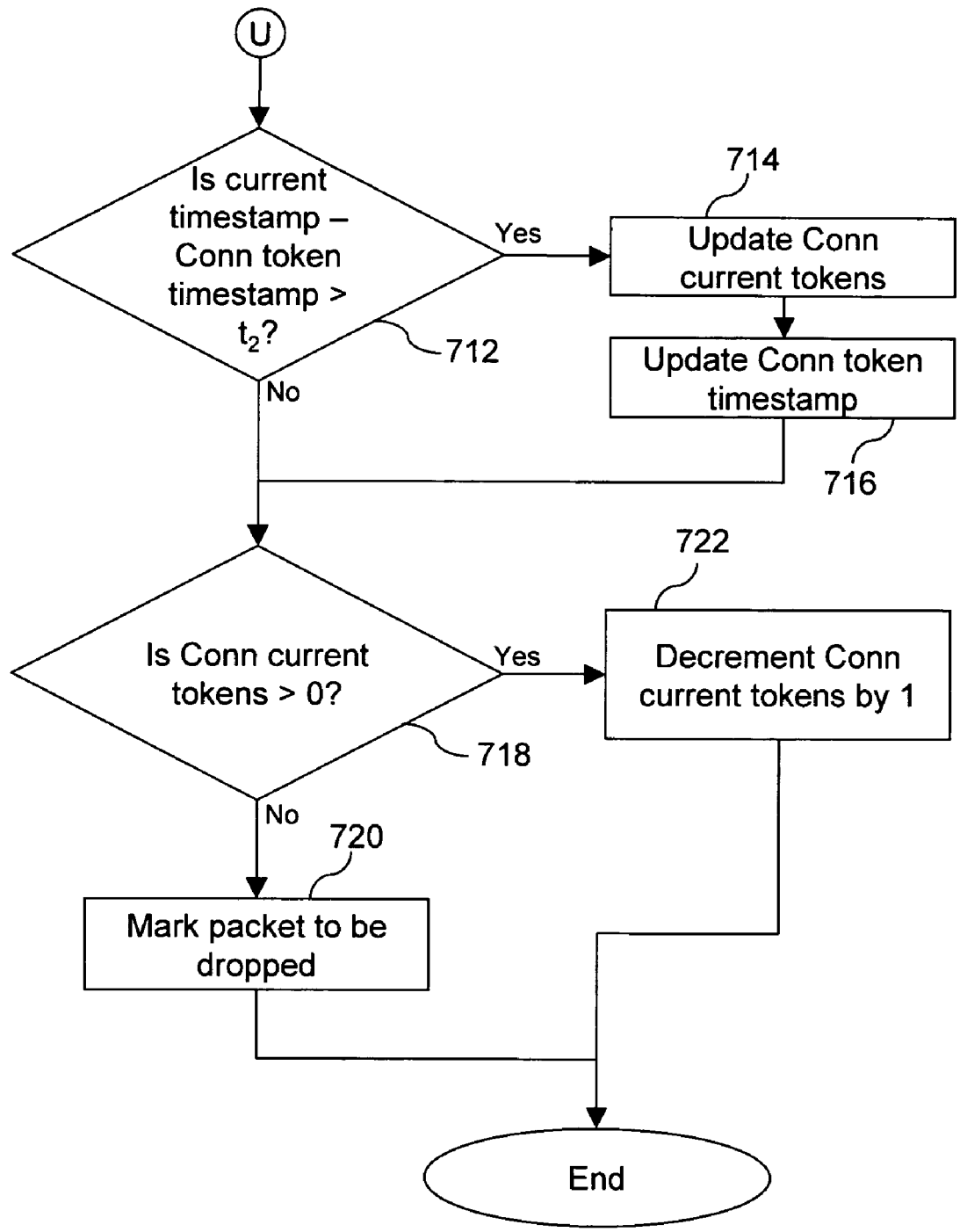

Another action that can be performed on the data packet is Connection Limit. This action involves controlling the passage of the data packets depending on the rate of arrival of new connection request data packets. Referring now primarily to FIG. 7A and FIG. 7B, the Connection Limit action is hereinafter described in detail. At step 702 a check is made to determine whether the data packet is a new connection request data packet. If the data packet is not a new connection request data packet, no action is performed on the data packet. Otherwise at step 704 a check is made to determine whether the attack is a counter based DDoS attack. If the attack is a counter based DDoS attack, then at step 706 a record corresponding to InIP is retrieved from the COT. If the attack is not a counter based DDoS attack, then at step 708 a record corresponding to OutIP is looked up from the IAT. After the record has been retrieved from the appropriate table, the value of current timestamp is obtained at step 710.

At step 712 the value of Conn token timestamp is compared with the value of current timestamp. If the value of current timestamp is greater than the value of Conn token timestamp by at least a pre-defined value $t_2$, then at step 714 the value of Conn current tokens is increased in the record.

Subsequently at step 716 the value of Conn token timestamp is updated with the value of current timestamp. Then, regardless of the result of step 712, the value of Conn current tokens is compared at step 718 with the length of the data packet under consideration. If the length of the data packet is more than the value of Conn current tokens, the data packet is marked to be dropped at step 720. Otherwise at step 722 the value of Conn current tokens is reduced by a one.

In a preferred embodiment of the present invention, the value of $t_2$ is set as 1 second. Also, the value of Conn current tokens is increased to Max Connection rate when the required condition is met.

In an alternative embodiment of the present invention, the increase in the value of Conn current tokens is proportional to the difference between current timestamp and Conn token timestamp.

Figure 8:
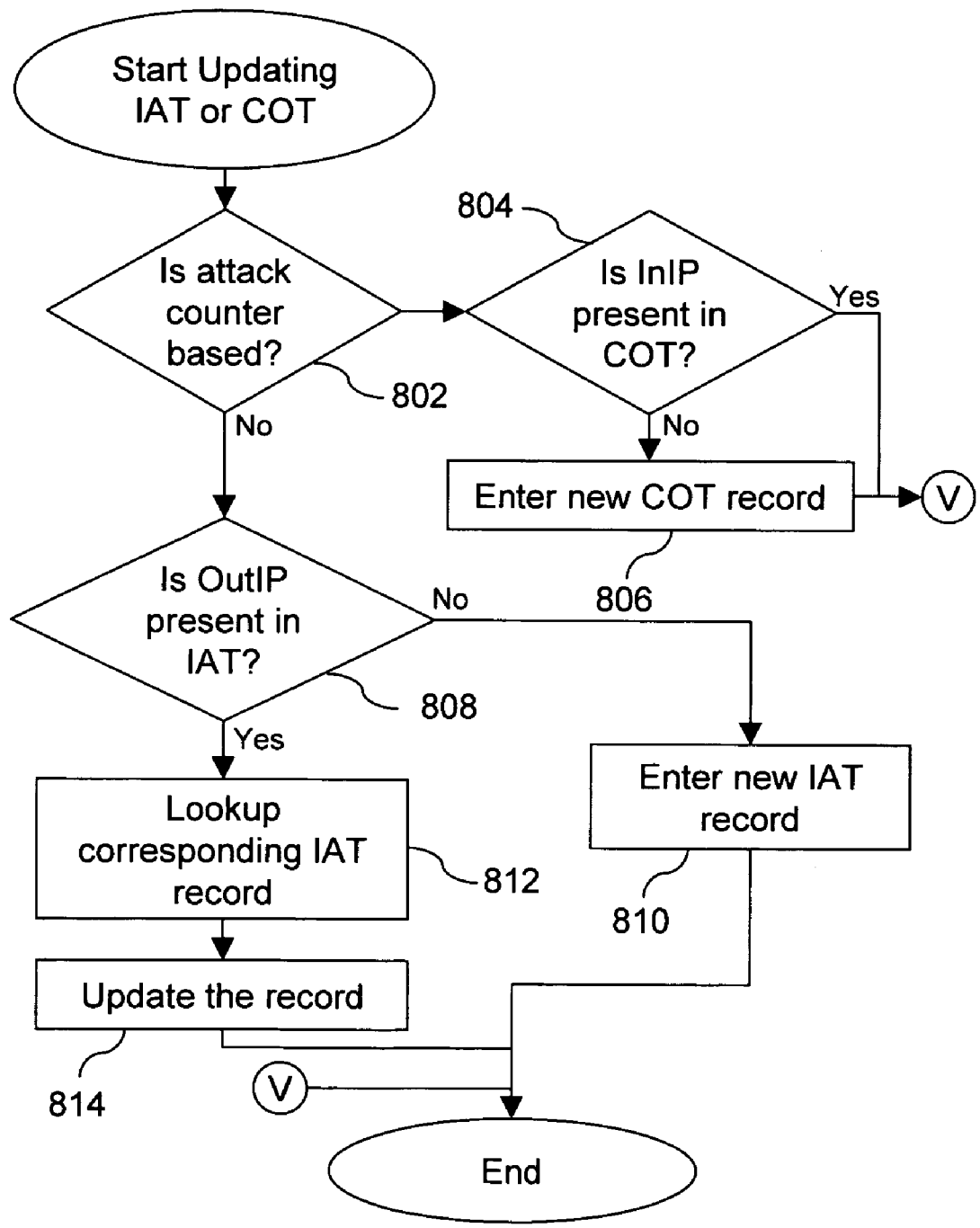
FIG. 8 depicts the step of updating an Intrusion Counter Table (COT) or an Intrusion Attacker Table (IAT).

As mentioned earlier, in case of an attack the actions performed by the sQoS module may involve the updating the IAT or the COT. The method of updating is described herein. Referring now primarily to FIG. 8, the step of updating the IAT or the COT is hereinafter described in detail.

At step 802 a check is made to determine whether the attack is counter based DDoS attack. If the attack is counter based DDoS attack, then at step 804 a check is made to determine whether a record corresponding to InIP is present in the COT. If the record corresponding to InIP is not present in the COT, then at step 806 a new record is created in the COT.

Referring back to step 802, if the attack is not a counter based DDoS attack, then at step 808 a check is made to determine whether a record corresponding to OutIP is present in the IAT. If the record corresponding to OutIP is not present in the IAT, then at step 810 a new record is created in the IAT. However, if the record corresponding to OutIP exists, then at step 812 the record is retrieved. Subsequently, two or more of the attributes of the record are updated at step 814. For example, if the action is HardenFW, then IAT Action is updated accordingly and FW start time is also updated. However, FW harden period may or may not be updated. If the action is ControlBW, then IAT Action is updated accordingly and BW start time is also updated. However, BW control period may or may not be updated. If the action is ConnectionLimit, then IAT Action is updated accordingly and Conn start time is also updated. However, Conn limit period may or may not be updated.

In a preferred embodiment of the present invention, both the COT and the IAT are implemented in conjunction with hash tables. While one of the hash tables contains keys to records in the COT, the other hash table contains keys to records in the IAT. When a new record is added to the COT or the IAT, the corresponding hash table is also updated.

One of the advantages of the present invention is that it provides response to intrusion attacks on computers on the network, while keeping the Quality of Service up to a secure level. Another advantage of the present invention is that it performs appropriate actions in response to DDoS attacks, in addition to conventional DoS attacks. A further advantage of the present invention is that it provides protection to the computers on the network from intrusion attacks, by utilizing history of the intrusion attacks.

As mentioned earlier, the present invention accomplishes this in conjunction with IDS and other modules of Policy Agent.

The system, as described in the present invention or any of its components may be embodied in the form of a processing machine. Typical examples of a processing machine include a general-purpose computer, a programmed microprocessor, a micro-controller, a peripheral integrated circuit element, and other devices or arrangements of devices that are capable of implementing the steps that constitute the method of the present invention.

The processing machine executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the processing machine to perform specific tasks such as the steps that constitute the method of the present invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

A person skilled in the art can appreciate that it is not necessary that the various processing machines and/or storage elements be physically located in the same geographical location. The processing machines and/or storage elements may be located in geographically distinct locations and connected to each other to enable communication. Various communication technologies may be used to enable communication between the processing machines and/or storage elements. Such technologies include session of the processing machines and/or storage elements, in the form of a network. The network can be an intranet, an extranet, the Internet or any client server models that enable communication. Such communication technologies may use various protocols such as TCP/IP, UDP, ATM or OSI.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method of ensuring a quality of services being provided by a protected network of computers during an ongoing security breach, the quality of the services being ensured by performing secure Quality of Service (sQoS) actions on one or more data packets, the data packets being directed from one or more source computers to a destination computer, the source computers and the destination computer being a part of a network of computers, the sQoS actions being performed in response to receiving a triggering information from an external system, the triggering information comprising information regarding the type of attack, the method comprising the steps of:
  a. performing the sQoS actions on each of the data packets, the actions depending on the triggering information received, the step of performing the sQoS actions on each of the data packets further comprising the steps of:
    i. determining whether the triggering information corresponds to an attack,
    ii. if the triggering information corresponds to an attack, then checking whether the attack is a counter based Distributed Denial of Service(DDoS) attack,
    iii. if the attack is a counter based DDoS attack, then performing the following steps:
      1. performing the actions corresponding to a counter based DDoS attack, and
      2. processing the packet against an Intrusion Attack Table(IAT), the IAT containing records, the records storing information corresponding to packet based attacks and sequence based attacks by one or more source computers,
    iv. if the triggering information corresponds to an attack and if the attack is not counter based DDoS attack, then performing the following steps:
      1. performing the actions corresponding to a packet based attack, a sequence based attack or a counter based DoS attack, and
      2. processing the packet against the IAT, and
    v. if the triggering information does not correspond an attack, then processing the packet against the IAT; and
  b. releasing the data packets after the sQoS actions are performed.

2. The method as recited in claim 1 wherein the step of performing the sQoS actions further comprises the step of appending data to the data packets, the appended data indicating the action to be taken by processors to which the data packets go after being released.

3. The method as recited in claim 1 wherein the step of performing the actions corresponding to a counter based DDoS attack comprises the steps of:
  a. determining whether the action to be performed is controlling bandwidth (ControlBW);
  b. if the action to be performed is ControlBW, then performing the following steps:
    i. updating the Intrusion Counter Table (COT), and
    ii. restricting the flow of the data packets to the destination computer, the flow being restricted on the basis of length of the data packets;
  c. if the action to be performed is not ControlBW, then determining whether the action to be performed is limiting number of connections (ConnectionLimit);
  d. if the action to be performed is ConnectionLimit, then performing the following steps:
    i. updating the COT, and
    ii. controlling the number of connections to the destination computer;
  e. if the action to be performed is not ConnectionLimit, then determining whether the action to be performed is Drop;
  f. if the action to be performed is Drop, then marking the packet to be dropped;
  g. if the action to be performed is not Drop, then checking whether the action to be performed is Alert;
  h. if the action to be performed is Alert, then directing an alert message;
  i. if the action to be performed if not Alert, then checking whether the action to be performed is Log;
  j. if the action to be performed is Log, then updating a log file with information regarding intrusion; and
  k. sending the packet for processing against the IAT.

4. The method as recited in claim 1 wherein the step of performing the actions corresponding to a packet based attack, a sequence based attack or a counter based DoS attack comprises the steps of:
  a. determining whether the action to be performed is hardening a firewall (HardenFW);
  b. if the action to be performed is HardenFW, then performing the following steps:
    updating an IAT, the IAT containing records, the records storing information corresponding to packet based attacks and sequence based attacks by one or more source computers,
    hardening a firewall, the firewall being hardened to block the flow of the data packets, and c. if the action to be performed is not HardenFW, then determining whether the action to be performed is ControlBW;
d. if the action to be performed is ControlBW, then performing the following steps:
  i. updating the IAT, and
  ii. restricting the flow of the data packets from the source computer, the flow being restricted on the basis of length of the data packets;
e. if the action to be performed is not ControlBW, then determining whether the action to be performed is ConnectionLimit;
f. if the action to be performed is ConnectionLimit, then performing the following steps:
  i. updating the IAT, and
  ii. controlling the number of connections from the source computer;
g. if the action to be performed is not ConnectionLimit, then determining whether the action to be performed is Drop;
h. if the action to be performed is not Drop, then checking whether the action to be performed is Alert;
i. if the action to be performed is Alert, then directing an alert message;
j. if the action to be performed if not Alert, then checking whether the action to be performed is Log;
k. if the action to be performed is Log, then updating a log file with information regarding the attack; and
l. sending the packet for processing against the IAT.

5. The method as recited in claim 1 wherein the step of processing the packet against the IAT comprises the steps of:
a. checking whether the data packet is an IP packet;
b. if the data packet is an IP packet, then checking whether a record corresponding to IP address of the source computer exists in the IAT;
c. if a record corresponding to the IP address of the source computer exists in the IAT, then retrieving the record;
d. retrieving the action to be performed, the retrieval being done from the record;
e. checking whether the action to be performed is ControlBW;
f. if the action to be performed is ControlBW, then checking whether a BW control period has expired;
g. if the BW control period has not expired, then restricting the flow of the data packets, the flow being restricted on the basis of length of the data packets;
h. if the action to be performed is not ControlBW, then checking whether the action to be performed is ConnectionLimit;
i. if the action to be performed is ConnectionLimit, then checking whether a Conn limit period has expired;
j. if the Conn limit period has not expired, then controlling the number of connections;
k. if the action to be performed is not ConnectionLimit, then checking whether the action to be performed is HardenFW;
l. if the action to be performed is HardenFW then checking whether a FW harden period has expired; and
m. if the FW harden period has not expired then hardening a firewall, the firewall being hardened to block the flow of the data packets.

6. The method as recited in claim 5 wherein the step of checking whether the BW control period has expired further comprises the step of calculating the BW control period from a BW start time and a BW control time period, the BW start time and the BW control time period being stored in the record.

7. The method as recited in claim 5 wherein the step of checking whether the Conn limit period has expired further comprises the step of calculating the Conn limit period from a Conn limit start time and a Conn limit time period, the Conn limit start time and the Conn limit time period being stored in the record.

8. The method as recited in claim 5 wherein the step of checking whether the FW harden period has expired further comprises the step of calculating the FW harden period from a FW harden start time and a FW harden time period, the FW harden start time and the FW harden time period being stored in the record.

9. The method as recited in claim 3, wherein the step of restricting the flow of the data packets further comprises the steps of:
a. if the attack is a counter based DDoS attack, then retrieving a record from the COT, the retrieval being done on the basis of IP address of the destination computer;
b. if the attack is not a counter based DDoS attack, then retrieving a record from the IAT, the retrieval being done on the basis of IP address of the source computer;
c. retrieving a value of BW token timestamp from the record, the value of BW token timestamp being the timestamp when a value of BW current tokens was updated;
d. if the current time is greater than the value of BW token timestamp by a pre-defined interval, then increasing the value of BW current tokens in the record;
e. if the data packet length is less than the value of BW current tokens, then subtracting data packet length from the value of BW current tokens and assigning the value obtained as the value of BW current tokens; and
f. if the data packet length is greater than the value of BW current tokens, then marking the data packet to be dropped.

10. The method as recited in claim 3, wherein the step of controlling the number of connections further comprises the steps of:
a. if the attack is a counter based DDoS attack, then retrieving a record from the COT, the retrieval being done on the basis of IP address of the destination computer;
b. if the attack is not a counter based DDoS attack, then retrieving a record from the IAT, the retrieval being done on the basis of IP address of the source computer;
c. retrieving a value of Conn token timestamp from the record, the value of Conn token timestamp being the timestamp when a value of Conn current tokens was updated;
d. if the current time is greater than the value of Conn token timestamp by a pre-defined interval, then increasing the value of Conn current tokens in the record;
e. if the value of Conn current tokens is greater than zero, then subtracting one from the value of Conn current tokens and assigning the value obtained as the value of Conn current tokens; and
f. if the value of Conn current tokens is not greater than zero, then marking the data packet to be dropped.

* * * * *